United States Patent [19]

Peterson et al.

[11] 4,005,249

[45] Jan. 25, 1977

[54] POLYMERIZATION OF VINYL CHLORIDE

[75] Inventors: Harold E. Peterson, Lambertville, Mich.; Philip P. Rathke, Toledo, Ohio

[73] Assignee: Owens-Illinois, Inc., Toledo, Ohio

[22] Filed: Feb. 15, 1972

[21] Appl. No.: 226,417

[52] U.S. Cl. .................................. 526/60; 526/61; 526/86; 526/88; 526/227; 526/344; 526/345; 526/909

[51] Int. Cl.² ............................................ C08F 14/06

[58] Field of Search ............... 260/92.8 R; 526/60, 526/344, 345

[56] References Cited

UNITED STATES PATENTS

| | | | |
|---|---|---|---|
| 3,033,839 | 5/1962 | Heckmaier | 260/87.1 |
| 3,473,896 | 10/1969 | Halder | 23/285 |
| 3,480,606 | 11/1969 | Thomas | 260/92.8 |
| 3,522,227 | 7/1970 | Thomas | 260/92.8 |
| 3,544,280 | 12/1970 | Thomas | 23/290 |
| 3,558,584 | 1/1971 | Thomas | 260/92.8 |
| 3,681,308 | 8/1972 | Irvin | 260/80.78 |
| 3,683,051 | 8/1972 | Chatelain | 260/878 R |
| 3,687,923 | 8/1972 | Thomas | 260/92.8 R |
| R25,763 | 2/1962 | Marous | 260/92.8 R |

OTHER PUBLICATIONS

Hydrocarbon Processing, Nov. '68, vol. 47, No. 11, pp. 192–196, *New Improved Bulk PVC Process*, by Thomas, Jean-Claude.

*Primary Examiner*—John Kight, III
*Attorney, Agent, or Firm*—Robert F. Rywalski; Edward J. Holler

[57] ABSTRACT

Homopolymers and copolymers of vinyl chloride are produced in the form of a powder by a bulk polymerization process which involves a dual temperature operation. Vinyl chloride (either alone or admixed with other copolymerizable monomers) is contacted with conventional polymerization initiators in the absence of solvents or diluents at a first temperature of from about 68° to about 110° F until the polymerization has proceeded to 0.1 to 10% of completion and thereafter the temperature is raised to 120° to 150° F until the polymerization has reached the desired conversion.

9 Claims, 1 Drawing Figure

U.S. Patent  Jan. 25, 1977  4,005,249

POLYMERIZATION OF VINYL CHLORIDE

BACKGROUND OF THE INVENTION

1. Field of the Invention

This invention relates to polymerization processes and, more particularly, it relates to the formation of particulate polymers of the type which are insoluble in a liquid monomeric medium in which the polymerization is effected. Still more particularly, this invention relates to a novel method for the bulk polymerization of vinyl halide, and particularly the polymerization of vinyl chloride.

2. Description of the Prior Art

Various polymerization processes are known in the art wherein a polymer is formed in a polymerization atmosphere wherein the monomer, or mixture of polymerizable monomers, is maintained as a liquid with the resultant formation of a polymer which is insoluble in the liquid monomeric system. The bulk polymerization of vinyl halides, including the bulk polymerization of the vinyl chloride homopolymer, as well as the bulk polymerization of copolymers of vinyl chloride with other compatible copolymerizable monomers, is well known in the art. In the bulk polymerization of vinyl halides, for example, vinyl chloride, a monomer is typically put in a suitable polymerization reactor, so as to maintain it in a liquid condition, and in the presence of an effective polymerizing amount of a free radical catalyst or initiator and under temperature and pressure conditions favorable to polymerization, the resultant polymer is formed which is insoluble in the monomer system, the monomer, of course, being depleted as polymerization proceeds. The polymerization may, of course, proceed to a suitably selected end point, at which point the polymerization, even if not entirely complete, may be stopped and the product isolated.

While those skilled in the art realize that relative to other polymerization processes, the product of a bulk polymerization process is generally substantially free of impurities and the process for producing this product is potentially efficient and economical, these benefits, especially the latter two, have not been fully achieved in the area of bulk vinyl polymerization. Thus, for example, a simple and economical bulk polymerization process for the formation of vinyl polymers, for example, vinyl halides and especially vinyl chloride homopolymers, and copolymers of vinyl halides with compatible copolymerizable monoethylenically unsaturated monomers, has not yet become a commercial reality. The reason for this apparently resides in the fact that these types of bulk polymerization reactions are highly exothermic and with the free radical initiators employed proceed at a rate which is strongly dependent on temperature. Because of the foregoing characteristics of the reaction, along with the fact that severe problems with heat transfer are encountered in the reaction because of the viscosity increase in the system, these bulk polymerization processes have been very difficult to control. This lack of control creates special problems in the bulk polymerization of vinyl chloride, because of the difficulty of maintaining good heat transfer during the entire polymerization reaction wherein the reaction mass is a thick slurry at a conversion of about 15–20%, then proceeds to a wet cake at a conversion of about 25–30% and a powder after a conversion of about 45–50%. These control problems are obviously not conducive to the formation of a high quality product inasmuch as, for example, extensive localized heating may cause the formation of significant excessive amounts of skins and large thermally degraded aggregates which, of course, are undesirable. Poor process control also results in the formation of gels, or fisheyes, in the final product.

Attempts have been made in the art to resolve some of these difficulties but they typically employ the use of a plurality of reactors to accomplish the total polymerization and also require the use of different agitator speeds during the polymerization process with the initial agitation speed being quite high and thereby consuming large amounts of power. Thus, these attempts are not economically satisfactory in that they require substantial initial capital investments and the operating costs are also high.

A typical example of a heretofore practiced prior art procedure for overcoming the difficulties inherent in the bulk polymerization of vinyl chloride is set forth in U.S. Pat. No. 3,522,227. In this patent, a two stage bulk polymerization process is set forth wherein polymerization of vinyl chloride is carried out in a first stage under severe conditions of agitation and high turbulence and thereafter completed in a second stage which is preferably a different reactor maintained under much milder conditions of agitation. It should become immediately apparent that this prior art procedure resulted in an extremely high cost in the first stage with respect to equipment and operating power in order to carry out the high speed agitation. The high speed was thought to be necessary in order to overcome the difficulties which were encountered in the bulk polymerization of vinyl chloride such as, for example, production of a particulate product.

A far more effective solution to the overall problem is set forth in copending application Ser. No. 111,496, filed Feb. 1, 1971. This application is directed towards the use of a frusto-conical type reactor wherein the bulk polymerization of vinyl chloride can be carried out in an efficient manner without necessitating the high speed agitation which the prior art workers thought necessary. However, the polymeric product resulting from the process of said application, although admirably suited for a wide variety of applications, nevertheless, did appear to cause some problems when said material was desired to be used in the formulation of plastic bottles.

For reasons which are not completely understood, it appears that in the fabrication of plastic bottles from polyvinyl chloride powders, there is a certain broad range of desired particle size which makes the polymeric product compatible with the processing equipment necessary to produce these bottles. The particle size distribution which was obtained by the process of Ser. No. 111,496 was not optimum for the production of plastic bottles.

Additionally, it is noted that in all the prior art processes for the bulk polymerization of vinyl chloride there is an inherent disadvantage in that a substantial amount of polymer in the form of a scale is deposited on the internal surfaces of the reaction vessel which builds up during the course of the polymerization reaction up to the point where it must be removed. The removal of this material is expensive not only from the point of view of the manpower which is required to scrape or otherwise remove the material from the internal surfaces of the equipment, but also due to the fact that there is down time while the procedure is being carried out thereby resulting in an economic liability. A further economic penalty arises from the fact that the scale must be mechanically ground and then sold as a "second grade" product.

The process of this invention admirably overcomes the difficulties of the heretofore practiced processes. In the first place, the particle size distribution of resulting polyvinyl chloride powders are well suited for the production of plastic bottles. Secondly, for reasons which are not completely understood, it has been found that in the present process, there is substantially less build-up of polymeric material on the internal surfaces of the reactor, thereby directly minimizing the effort which is necessary to remove the same and accordingly increasing the economic viability of said process. Additionally, the process of this invention minimizes the amount of extremely fine powder which is produced in the polymeric product. As can well be appreciated, fine powder is an economic liability due to the fact that it presents a potential health hazard in that it cannot be breathed into the lungs so that expensive filtering equipment must be used in order to prevent it from entering into the atmosphere. Additionally, fine powder is extremely abrasive and can cause damage to the various equipment with which it comes in contact.

SUMMARY OF THE INVENTION

With the foregoing in mind, it is the general object of this invention to provide a very simple and economical process for the bulk polymerization of vinyl chloride, said process requiring substantially decreased initial capital investment and also being very economical to run from a day to day operating point of view.

In accordance with this invention, it has been found that vinyl chloride can be polymerized or copolymerized in bulk by a process which involves the use of two separate and distinct polymerization stages wherein each stage is carried out at different temperatures. In the first stage, vinyl chloride in the absence of a diluent or solvent, is contacted with an initiator at superatmospheric pressures, and at a temperature of from room temperature to about 110° F, until from 0.1 to 10 weight percent conversion has occurred. The temperature is then raised to a final temperature of from 120° to 150° F and preferably 120°–140° F in a second stage until a conversion of about 65 weight percent or higher is obtained. It is absolutely essential in carrying out the process of this invention that there be mild agitation in the second stage, i.e. the elevated temperature stage. However, contrary to all expectations of the prior art, it has been found that it is not necessary to have any agitation at all in the first stage much less the violent type agitation heretofore thought necessary.

While not wishing to be bound by any theory of operation, nevertheless, it appears that the process of the instant invention accomplishes thermally that which the prior art had deemed necessary to accomplish by violent shearing agitation in the first stage. It has been recognized by the prior art workers that the first stage in the polymerization of polyvinyl chloride is directly responsible for the characteristics of the ultimate product which is produced when the polymerization is carried out substantially to completion, i.e. about 65%. Thus, it can be stated that the first stage "sets" the characteristics of the final polymer. For reasons which are not completely understood, it has been found that the first stage in the novel dual temperature process of this invention also sets the characteristics of the final polymeric product but this setting is accomplished in a far simpler and more controllable manner.

The first stage process of this invention is carried out by charging vinyl chloride and an initiator into a reactor maintained under conventional superatmospheric pressures and heating the same at a temperature ranging from about 70° to 110° F for a period of time sufficient to cause polymerization of the vinyl monomer in an amount of from 0.1 to about 10 weight percent.

The apparatus which is used for the first stage of the instant process is not at all critical and any autoclave apparatus can be employed which is conventionally used in the prior art. These apparatus include a fixed vertical cylinder with a paddle type of agitator, a fixed horizontal cylinder with a helical agitator, a fixed horizontal cylinder with a straight blade agitator, one with short blades in opposed positions and one having a rotary horizontal cylinder. Apparatus of this general type are set forth in U.S. Pat. No. 3,522,227 and are well suited for carrying out the first stage of the instant invention. A preferred apparatus for carrying out the first stage of the instant invention are autoclaves which have a frusto-conical shape which are disclosed in the aforementioned copending application Ser. No. 111,496.

As has heretofore been stated, there is no requirement that there be any agitation at all in the first stage of the instant invention although it is preferred that a mild type of agitation be present. This mild type of agitation will be discussed in detail later on in the specification, but all that is preferred in this first stage is that the agitation be sufficient to assure uniform heat exchange within the reaction mass. This type of agitation, which is preferred in the first stage, is exactly the same type of agitation which has been found to be necessary in the second stage.

The initiators which are used in the first stage of the instant process are not narrowly critical and any initiator can be used which has a 10-hour half life temperature of from about 15° to about 45° C. Typical initiators which can be used in the first stage include 2-methyl pentanoyl peroxide, tertiary butyl peroxypivalate, diisopropyl peroxydicarbonate, di(secondary butyl)-peroxydicarbonate, di(2-ethylhexyl)peroxydicarbonate, acetyl cyclohexane sulfonyl peroxide, diisobutaryl peroxide. Other initiators having the above half life are well known in the art and can also be used.

The reason that the first stage initiator should have a 10-hour half life temperature of from about 15° to about 45° C is due to the fact that it is desired that when the first stage reaction is completed, the concentration of unreacted initiator which is left should not be such that it has an adverse effect on the thermal stability of the polyvinyl chloride polymer. Initiators having the aforementioned half life accomplish this objective.

The amount of initiator which is used in the first stage is also not narrowly critical and can range from about 0.001 to about 0.1 weight percent of initiator based on the vinyl chloride monomer charged. A preferred concentration of initiator ranges from 0.005 to about 0.06 weight percent.

The method by which the first stage heating is carried out is not narrowly critical providing the temperature limits are maintained and it is possible to gradually increase the first stage temperature of from 80° to about 110° F until the polymerization is from 0.1 to 10%. However, it has been found that a closer control of particle size distribution can be effected if the reaction mass is maintained at a constant temperature within the range of 80° to 110° F for at least 15 minutes and, more preferably, at least 30 minutes. This "hold" for at least ½ hour at a constant temperature enhances the particle size distribution and, as such, is a preferred embodiment of the instant invention. It is also within the scope of this invention to carry out the first stage polymerization at isothermal conditions. As is well known, the polymerization of vinyl chloride is an exothermic reaction and the temperature will increase as the reaction proceeds unless steps are taken to provide cooling so as to maintain the temperature. The particularly preferred embodiment of this invention resides in carrying out the first stage under isothermal conditions, i.e. adding the initiator to vinyl chloride monomer at a given temperature within the range of from room temperature to 110° F and providing cooling so as to maintain the temperature in a substantially constant state.

Although the first stage can be carried out at any temperature from room temperature up to about 110° F a preferred embodiment resides in carrying out this reaction at about 70° to 100° F. Additionally, although the first stage of this process can be carried out until the polymerization has reached a stage of completion ranging from about 0.1 to about 10 weight percent, the preferred embodiment resides in carrying out the first stage until the degree of polymerization is from 1 to 5 weight percent.

After the first stage has been completed, the reaction mass, either alone or with up to 50 weight percent of additional vinyl chloride, is rapidly heated to the second stage temperature of from 120°–140° F and maintained at this temperature until the polymerization is completed. The final degree of polymerization is usually about 65 or 70 weight percent which is conventional. The second stage can be carried out at temperatures higher than 150°F but, as is well known in the art, the temperature has a direct bearing molecular weight of the final product and it has been found that temperatures within the range of about 120° to about 140°F give the most desirable molecular weight. It is for precisely this reason that it is necessary that the transition between the first stage and the second stage be a rapid one in order to insure that the majority of the product is formed at the second stage temperature. The expression "rapidly heating" from the first stage to the second stage is intended to mean that sufficient heat is temperature until the polymerization is completed. The final degree of polymerization is usually about 65 or 70 weight percent which is conventional. The second stage can be carried out at temperatures higher than 150° F but, as is well known in the art, the temperature has a direct bearing on the molecular weight of the final product and it has been found that temperatures within the range of about 120° to about 140° F give the most desirable molecular weight. It is for precisely this reason that it is necessary that the transition between the first stage and the second stage be a rapid one in order to insure that the majority of the product is formed at the second stage temperature. The expression "rapidly heating" from the first stage to the second stage is intended to mean that sufficient heat is applied after the first stage reaction so as to raise the temperature of the reaction mass at a rate which is at least about 20° F per hour and even more desirably at least 40° F per hour.

As has heretofore been mentioned, it has been found that it is absolutely critical in the novel process of this invention that the second stage of the dual temperature process be carried out under a specific type of agitation. If this second stage is carried out either with no agitation at all or with agitation other than that which will be subsequently described, the improved results simply will not be obtained.

The second stage agitation which is required in the novel process of this invention is a mild type of agitation which is sufficient to assure uniform heat exchange within the reaction mass. It is a low turbulent agitation which insures complete mixing of the reaction mixture. This type of agitation including methods of accomplishing the same is fully disclosed in U.S. Pat. No. 3,522,227 and the procedures and apparatus disclosed therein for providing the mild agitation in the second stage of the process disclosed in said patent are identical with those required in the second stage of this instant process. The particularly preferred apparatus for carrying out both the first and second stage reaction are reactors of the frusto-conical type disclosed in aforementioned Ser. No. 111,496.

If, on the other hand, a high turbulent type agitation is employed in the second stage, a desirable polymeric product simply will not be obtained. Additionally, if there is no agitation in the second stage of the instant process, desirable powders will not be obtained, but rather, polymeric product will set up in a large solid block.

In carrying out the second stage polymerization, it is generally necessary to have additional initiators in order to effect a desired degree of polymerization. These second stage initiators are not narrowly critical providing that they have a 10-hour half life temperature of from about 40° to about 65° C and more preferably from about 40° to about 60° C. Typical initiators falling within the above definition would include tertiary butyl peroxypivalate, diisopropyl peroxydicarbonate, di(secondary-butyl)peroxydicarbonate, di(2-ethyl hexyl)peroxydicarbonate, lauroyl peroxide, decanoyl peroxide, pelargonyl peroxide, caprylyl peroxide, diisononanoyl peroxide. The above list is not intended to be exhaustive and other initiators having the required 10-hour half life temperature of from 40° to 60° C can be used.

As is obvious from the requirements of the first and second stage initiators, there is an overlap in 10-hour half life temperature so that certain initiators can be used for both the first and second stage in the novel polymerization process of this invention.

Thus, for example, tertiary butyl peroxypivalate can be used in both the first and second stage and the entire quantity of initiator can be added in the first stage, the reaction mass heated to the first stage temperature until the requisite polymerization has occurred and then simply rapidly heating the reaction mixture to the second stage temperature without adding additional initiator. Conversely, a portion of the initiator can be added in the first stage and a portion of the initiator added at the second stage. In any event, the amount of initiator which is present in the second stage is from about 0.03 to about 0.3 weight percent based on the vinyl chloride monomer. The preferred concentration of initiators is from 0.035 to 0.15 weight percent.

The following examples will illustrate the best mode contemplated for carrying out this invention.

EXAMPLE 1

This example will illustrate the preparation of a homopolymer of vinyl chloride prepared by the novel bulk polymerization process of this invention. The reaction vessel used was a frusto-conically shaped pressure container with a vertically disposed longitudinal axis containing an agitator of an elongated shaft carrying a plurality of helical screw flights thereon, with a longitudinal axis inclined with respect to the vertical axis of the reactor and generally parallel to the side walls of the frusto-conical portion. This reactor is described in application Ser. No. 111,496.

The reactor was pre-conditioned for the polymerization by charging 1–2 kg. of liquid vinyl chloride and then permitting the vinyl vapor to boil to dryness, displacing any residual air or other gas. From a pressurized monomer reservoir, 19.5 kg. of liquid vinyl chloride and four grams of a 50 weight percent solution of 2-methylpentanoyl peroxide in odorless mineral spirits was then charged to the reactor. The reactor was agitating at a screw speed of 120 r.p.m. and an orbital speed of around 4 r.p.m.

The reactor and its contents were then heated by passing hot water (at 110° F) through an annular jacket around the reactor and when a temperature of 97° F was obtained, as measured by a pressurized thermocouple inserted into the reacting liquid, the reaction mass was held at said temperature for 30 minutes. At this point, the pressure was 68 psig, and the conversion, as measured by sampling the reactor contents, was 1.5%.

The heating water temperature in the reactor jacket was increased to 157° F. Heat-up to 138° F took about 1 hour. The pressure increased to 132 psig and the conversion had increased to 1.9%. At this point, 10.7 grams of a 75 weight percent t-butyl peroxypivalate solution in odorless mineral spirits was added. This is 0.04% initiator based on total monomer charged. This initiator was flushed into the reactor with 0.5 kg. of vinyl chloride liquid.

During the remaining run time, the reaction temperature was held at 140° F ± 3° F while the pressure fluctuated between 131 and 145 psig with the temperature cycles observed. About 1 hour after adding the second initiator the reaction was a thick slurry. About 2½ hours after this initiator charge, the polymer appeared to be drying out and the total batch appeared to be expanding. The reaction was complete about 8 hours after the first initiator charge, as evidenced by a pressure drop of 30 psig over the last 1½ hours. The reactor was vented to atmospheric pressure and the batch dropped into a bag from the bottom port. The conversion was 78.4% based on the total monomer charged.

The polymer produced was granular, the particles being essentially spherical and discrete. The apparent density was 0.503 g/cc, as measured by ASTM-D-1895-65T.

Screen analysis of the product gave the following particle size distribution:

| U.S. Screen Number | Weight Retained on Screen |
| --- | --- |
| 30 | 0.9 |
| 40 | 1.0 |
| 50 | 11.0 |
| 80 | 59.1 |
| 100 | 17.3 |
| 120 | 6.3 |
| 140 | 1.6 |
| 200 | 1.9 |
| pan | 0.9 |

As can be seen from the above, 86.2 weight percent of the product was between the No. 50–200 Screens or within the range of 74–300 microns.

EXAMPLE 2

This example will illustrate that agitation in the first stage is unnecessary. The procedure of Example 1 was repeated except that the agitation was used for only 2 minutes to disperse the initiator as it was charged. The agitator was turned off prior to heating to 94° with 110° F water. When the temperature reached 94° F, a conversion of 1.4% was measured. The reaction was then heated with 157° F water, again with no agitation. When the batch appeared creamy, at a conversion of 2.4% and a temperature of 110° F, the agitator was turned on and left on for the remainder of the run at the same speeds as in Example 1. One hour after the agitation was turned on, the reaction reached the final temperature of 140° F. One-half hour after reaching temperature, 0.04% t-butyl peroxypivalate was added with 0.5 kg. of vinyl chloride as in Example 1. The conversion at this point was 5.7%. About 6½ hours after polymer was first observed, the pressure had dropped over 40 psig and the reaction was vented. A conversion of 84% resulted.

The polymer was again a granular product, having an apparent density of 0.471 g/cc.

Screen analysis of the product gave the following particle size distribution:

| U.S. Screen Number | Weight Retained on Screen |
| --- | --- |
| 30 | 7.2 |
| 40 | 7.7 |
| 50 | 14.7 |
| 80 | 31.4 |
| 100 | 10.4 |
| 120 | 8.2 |
| 140 | 5.8 |
| 200 | 10.5 |
| pan | 4.1 |

As can be seen from the above, 66.3 weight percent of the product was between the No. 50–200 Screens or within the range of 74–300 microns.

This example indicates the complete lack of any agitation during the first initiation hold temperature and its lack of appreciable affect on the polymer particle properties.

EXAMPLE 3

This example will also illustrate that agitation is not necessary during the first stage.

Using the reactor as described in Example 1 and the procedure to charge the first initiator as in Example 2 (with the agitation on for only 2 minutes to disperse the initiator prior to starting the heat-up), the polymer was first observed at 81° F. Heating continued to about 100° F where the reaction mass was held at this temperature for 30 minutes. The screw was turned on for 2 minutes to take a sample. The conversion has reached 4.8%.

The water temperature was then increased to 160° F. However, after heating for 45 minutes, the reaction temperature had leveled off at 123° F without the agitator on. Therefore, the screw was turned on at this point, 1 hour and 40 minutes after polymer began forming, and the temperature immediately climbed to 135° F due to the mixing now occurring.

As in Examples 1 and 2, 0.04% of t-butyl peroxypivalate was then added with 0.5 kg. of vinyl chloride. 8½ hours after polymer formation, the reaction was vented. A conversion of 77% and an apparent density of 0.555 g/cc. were measured.

Screen analysis of the product gave the following particle size distribution:

| U.S. Screen Number | Weight Retained on Screen |
| --- | --- |
| 30 | 0.7 |
| 40 | 1.1 |
| 50 | 1.2 |
| 80 | 34.5 |
| 100 | 31.9 |
| 120 | 22.4 |
| 140 | 3.9 |
| 200 | 3.7 |
| pan | 0.6 |

As can be seen from the above, 96.4 weight percent of the product was between the No. 50–200 Screens or within the range of 74–300 microns.

This example indicates that small, discrete granular particles can be produced using a two-temperature initiation technique in the complete absence of agitation in the first stage.

EXAMPLE 4

This example will illustrate an operation outside the scope of this invention, i.e. a single temperature operation. In this example, the procedure of Example 1 was repeated at the same agitation rates described therein. However, water at 180° F was passed through the reactor jacket to quickly heat the reaction to 140° F as is done in prior art. Almost immediately upon beginning the heat-up, polymer formed at 67° F. The reaction reached 140° F 35 minutes after heat-up began. A sample, taken on reaching 140° F, indicated a conversion of 4.0% at this time. Forty-five minutes later, a second sample indicated a conversion of 4.2%. At this time, 0.04% t-butyl peroxypivalate was added with 0.5 kg. vinyl chloride.

Seven hours from the first polymer formation, the reaction was complete, as indicated by a 62 psig pressure drop. The conversion was 84% based on monomer charged, and the apparent density was 0.4 grams per cc.

Screen analysis of the product gave the following particle size distribution:

| U.S. Screen Number | Weight Retained on Screen |
| --- | --- |
| 30 | 1.7 |
| 40 | 13.1 |
| 50 | 38.9 |
| 80 | 13.6 |
| 100 | 4.6 |
| 120 | 7.4 |
| 140 | 4.8 |
| 200 | 6.9 |
| pan | 9.0 |

As can be seen from the above, 37.3 weight percent of the product was between the No. 50–200 Screens or within the range of 74–300 microns.

A comparison of this analysis with those in Example 1, 2 and 3 clearly indicates that the PVC resins produced in this example are of larger size than the particles produce in any of the previous examples.

EXAMPLE 5

To the reactor of Example 1 was charged 19.5 kg. of vinyl chloride and 0.01% (4.0 grams of 50% solution in mineral spirits) of 2-methylpentanoyl peroxide. Without any agitation at all, the temperature of the batch was raised to about 140° with 180° F heating water. Polymer began forming at about 78° F. 25 minutes after polymer began and at a temperature of about 140°F a sample of the unagitated batch was taken; the conversion at this point was apparently 5.9%. 25 Minutes after reaching 140° F, the agitation was turned on at the rates indicated in Example 1. 10 Minutes later, a second sample indicated the actual conversion to be only 5.0%, suggesting the concentrating effect of no agitation near the sample port at the bottom of the reactor. At this time, 0.04% of t-butyl peroxypivalate and 0.5 kg. of vinyl chloride were added. After 7 hours of running from the first sign of polymer, and after a pressure drop of over 50 psig, the reaction was vented and the batch dropped. A conversion of 84.2% of polymer with an apparent density of 0.45 grams/cc was found.

Screen analysis of the product gave the following particle size distribution:

| U.S. Screen Number | Weight Retained on Screen |
| --- | --- |
| 30 | 20.5 |
| 40 | 11.1 |
| 50 | 10.1 |
| 80 | 12.9 |
| 100 | 6.6 |
| 120 | 15.0 |
| 140 | 7.0 |
| 200 | 9.4 |
| pan | 7.4 |

As can be seen from the above 50.9 weight percent of the product was between the No. 50–200 screens of within the range of 74–300 microns. However, a substantial amount of product, i.e. 20.5 weight percent was retained of the No. 30 screen.

A comparison of this analysis and the one from Example 4 indicates that if the dual initiation temperatures are not used, inferior results will be obtained.

Additionally, the particles in this example were observed to be irregular agglomerates rather than discrete spherical particles.

EXAMPLE 6

This example will illustrate the criticality of having a mild agitation in the second stage.

In this example, the second stage agitation was too severe and approached the violent agitation of the first stage of U.S. Pat. No. 3,522,227. This experiment was carried out in a 1-liter vertical pressure reactor (autoclave) containing a vertically disposed agitator shaft having thereon one propeller type agitator at the bottom, and two turbine type agitators spaced about 1¼ inches from each other and above the propeller. The propeller was designed to provide a lifting action near the bottom of the reactor. The diameter of the agitators was around 1¼ inches, which was just under ½ the diameter of the glass insert in which the reaction was run inside the autoclave. The insert diameter of 2⅝ inches permitted the thermocouple and agitators to fit, while the insert slid easily into the 3 inches ID stainless autoclave. This reactor, after sealing the top to prevent leaks, was purged of all air by charging liquid vinyl chloride, then venting the vinyl vapors to displace undesirable gases.

400 Grams of liquid vinyl chloride was charged to the reactor. To an initiator charge port, 0.01 mole per liter, or 0.83 grams of 2,2'-azobisisobutyronitrile (AIBN) was charged. This was washed into the reactor, which was being agitated at 159 RPM, with 35 grams of additional vinyl chloride.

The electrically heated reactor was then warmed to a 40° C reaction temperature in about 1 hour. This temperature was maintained for an additional hour, after which the temperature was increased to 60° C in about 40 minutes. The reaction was held at 60° C for about 6 hours while agitating at the 159 RPM. After this time the reaction was vented and the reactor opened. The glass insert was removed and found to contain a nearly solid chunk of PVC, degraded to a yellow color near the bottom. The conversion was found to be 45% based on the weight of vinyl chloride charged.

It appears as though the two temperatures had no effect in preventing catastrophic agglomeration in this reactor even with agitation.

EXAMPLE 7

The procedure of Example 6 was repeated except that the agitation rate was 1200 rpm. Following the charge, the reactor was heated to 40° C in 50 minutes and held for 1 hour at this temperature. The temperature was then raised to 60° C during the next hour while continuing to agitate at 1200 rpm. After 1 hour at 60° C, the agitation rate was cut back to 164 rpm and held for the rest of the run. Total run time permitted was 8⅓ hours from initial charge. Two large chunks were found on venting and removing the glass insert. The largest chunk was found at the bottom of the insert. Like in the previous example, this chunk was badly degraded at the bottom. The conversion was found to be 40%. The above example illustrates the necessity of having mild agitation and low turbulence sufficient to insure complete mixing of the reaction mixture in the second stage.

EXAMPLE 8

To the reactor described in Example 1 was added 19.5 kg. vinyl chloride and 0.01% of diisobutyryl peroxide while agitating at speeds indicated in Example 1, and while heating with 160° F water. Three minutes after starting to heat, and 1 minute after charging the initiator, polymer was observed forming. The reaction reached the initiation hold temperature of 100° F in 10 minutes and was held at 100° F for 45 minutes. The temperature was raised to 140° with 168° F water. A sample indicated a conversion of 2.5%. One-half hour after reaching 140° F, 0.045% t-butyl peroxypivalate (12 grams of the 75% solution, based on the 20 kg. of vinyl chloride charged) plus 0.5 kg. vinyl chloride was added. After 6¼ hours from polymer formation, a 30 psig pressure drop signaled the end of the reaction and the reactor was vented. A 75% conversion of PVC having an apparent density of 0.392 grams/cc was measured.

Screen analysis of the product gave the following particle size distribution:

| U.S. Screen Number | Weight Retained on Screen |
|---|---|
| 30 | 0.9 |
| 40 | 4.6 |
| 50 | 26.0 |
| 80 | 37.9 |
| 100 | 7.3 |
| 120 | 9.7 |
| 140 | 1.7 |
| 200 | 7.4 |
| pan | 4.5 |

As can be seen from the above, 64.0 weight percent of the product was between the No. 50–200 Screens or within the range of 74–300 microns.

EXAMPLE 9

To the reactor system of Example 1 was charged 19.5 kg. of vinyl chloride and 0.003% of diisobutyryl peroxide, as a 50% solution in mineral spirits, while agitating with the screw at 120 r.p.m. and orbiting at 4 r.p.m. The reaction mass was then heated to 100° using 175° F water. Seventy minutes after starting to heat, and 60 minutes after polymer was observed forming, the reaction temperature had been at 100° F for about 55 minutes, and the conversion was then measured at 1.5%. While at this temperature, 0.045 weight percent of the t-butyl peroxypivalate was charged with 0.5 kg. of vinyl chloride in the manner described in Example 1. The temperature was then increased to 140° with 175° F water. After 7 hours reaction time, a conversion of 77.2% was found. The PVC had an apparent density of 0.42 grams/cc and a mean particle size of 233 μ.

Screen analysis of the product gave the following particle size distribution:

| U.S. Screen No. | Weight Retained on Screen |
|---|---|
| 30 | 0.9 |
| 40 | 1.2 |
| 50 | 22.7 |
| 80 | 43.8 |
| 100 | 15.6 |
| 120 | 8.9 |
| 140 | 1.3 |
| 200 | 4.0 |
| pan | 1.6 |

As can be seen from the above, 73.6 weight percent of the product was between the No. 50–200 Screens or within the range of 74–300 microns.

This example, compared to Example 8, shows the ability to either add initiator, heat, hold, heat and add the second initiator, or to add initiator, heat, hold, add second initiator and heat.

EXAMPLE 10

To the reactor system of Example 1 was charged 19.5 kg. of vinyl chloride. This monomer was heated to 100° F, and while agitating at rates listed in Example 9, a dual initiator system of 0.01% of the diisobutyryl peroxide (4 grams of the 50% solution) and 0.06% of the t-butyl peroxypivalate (16 grams of the 75% solution) was isothermally added with 0.5 kg. of vinyl chloride. Polymer formed within 2 minutes of this addition. The reaction mass was held at 100° F for 45 minutes at the end of which time a sample taken revealed a conversion of 2.5%. Five minutes later, the temperature was raised to 140° using 165° F water. Seven hours after initiator was added, 82% of the monomer had formed to polymer. This PVC had an apparent density of 0.53 grams/cc and a particle diameter average of 259 $\mu$.

Screen analysis of the product gave the following particle size distribution:

| U.S. Screen No. | Weight Retained on Screen |
|---|---|
| 30 | 1.1 |
| 40 | 1.1 |
| 50 | 4.8 |
| 80 | 64.1 |
| 100 | 10.7 |
| 120 | 6.6 |
| 140 | 4.1 |
| 200 | 4.5 |
| pan | 3.0 |

As can be seen from the above, 90 weight percent of the product was between the No. 50–200 Screens or within the range of 74–300 microns. In this example, heat, add both initiators, hold, and heat produced very similar results to those presented earlier.

EXAMPLE 11

In this example, 0.06% t-butyl peroxypivalate was added at 75° F to 20 kg. of vinyl chloride previously heated to this temperature in the reactor of Example 1. The reaction was further heated to 100° F using 130° F water. Polymer was noted forming about 10 minutes after the initiator charge, at a temperature of 83° F. After 30 minutes at 100° F, the conversion was measured at 0.7%. Using 160° F water, the reaction was then heated to 140° F. A total conversion of 73% resulted, and the mean particle size was 259 $\mu$. A screen analysis is shown below:

Screen analysis of the product gave the following particle size distribution:

| U.S. Screen No. | Weight Retained on Screen |
|---|---|
| 30 | 0.9 |
| 40 | 1.0 |
| 50 | 17.4 |
| 80 | 64.1 |
| 100 | 6.9 |
| 120 | 3.8 |
| 140 | 1.4 |
| 200 | 2.5 |
| pan | 2.0 |

As can be seen from the above, 78.7 weight percent of the product was between the No. 50–200 Screens or within the range of 74–300 microns.

This example indicates how a single initiator can be used to produce a polyvinyl chloride resin with properties similar to that described when using two initiators, provided a dual temperature is used. In this case, a heat, add, heat, hold, and heat technique was used.

EXAMPLE 12

For comparison purposes, this example will illustrate the effect of high temperature isothermal charging.

The reactor of Example 1 was charged with 18.5 kg. of vinyl chloride. The agitation as described in Examples 1 and 9 was turned on and the temperature taken to 149° F. 3.3 grams of acetyl cyclohexane sulfonyl peroxide, a 60% wet crystal (about 0.01% by weight on the monomer charged) along with 0.7 kg. of additional vinyl chloride were added. Polymer was observed forming immediately. Three samples were taken while at 150° F. The first one was taken 2 minutes after the initiator charge, and already the conversion was 4.8%. Sample 2, at 5.4% conversion, was taken just over one hour after the initiator addition. Sample 3 was taken about 2 hours after initiator addition at a conversion of 6.3%. After this 2 hour period, the reaction temperature was reduced to 140° F, and 50 grams of lauroyl peroxide was added with 0.7 kg. of vinyl chloride. After about 7½ hours from the first initiator addition, the reaction was vented. An overall conversion of 81% was noted, the PVC having an apparent density of 0.465 grams/cc.

Screen analysis of the product gave the following particle size distribution:

| U.S. Screen Number | Weight Retained on Screen |
|---|---|
| 30 | 32.1 |
| 40 | 10.8 |
| 50 | 15.2 |
| 80 | 14.8 |
| 100 | 8.6 |
| 120 | 6.5 |
| 140 | 2.9 |
| 200 | 5.2 |
| pan | 3.9 |

As can be seen from the above, 38 weight percent of the product was between the No. 50–200 screens or within the range of 74–300 microns.

This example indicates the direct effect that the initiation temperature has on particle size. Comparing this example with Example 1 shows the first temperature effect on particle size.

EXAMPLE 13

This example will illustrate that the process of this invention is not limited to a frusto-conically shaped reactor.

To a reactor of the type set forth in FIG. 6 of U.S. Pat. No. 3,522,227 is added enough liquid vinyl chloride, 20 kg., to purge the entire volume of any air as evaporation takes place. To this reactor is charged 175 liters of liquid vinyl chloride and 35 grams of a 50 weight percent solution in mineral spirits of 2-methylpentanoyl peroxide. This is 0.01% by weight of the monomer present when charged. Water, at a temperature of about 130° F is circulated through the jacket around the reactor to bring the temperature inside the reactor to 100° F. The temperature is held at this point for about one hour during which time around 1.3–2.0% of the monomer is polymerized. During this hour, the helical stirrer is off. At the end of the hour, however, the stirrer is turned on, at an agitation speed of between 30 and 50 RPM. This is the slow speed of the second stage of the process of said patent. The temperature of the circulating jacket water is now increased to around 200° F to heat the reacting monomer to a temperature of around 140° F. This temperature will produce a polymer with a final number average molecular weight of around 30,000. The reaction is held at the 140° F temperature for ½ to 1 hour. After which time, the initiator charger is re-charged with 0.04% of a 75% solution of t-butyl peroxypivalate in mineral spirits, which is washed into the reactor with an additional 25 liters of vinyl chloride. With the agitation maintained at the constant speed of 30–50 RPM, the reaction is allowed to run to completion as indicated by a pressure drop of around 20 psig. In a vessel of this size the conversion will be between 75–85%. The polymer will be granular, having an apparent density of around 26–32 lbs./cubic ft. The particle size and distribution will be like those indicated in Examples 2, 4, 6, 16, 17, etc. of U.S. Pat. No. 3,522,227 rather than 1, 3, 5, 18, etc. The bulk of the polymer produced will have a particle size between 100 and 300μ. It will also be noticed that after discharging the batch, the amount of polymer build-up remaining in the reactor will be appreciably less than the amount of polymer remaining if this example is repeated except that the batch is heated "quickly" to 60° C. without any initiation hold temperature.

Figure 1:
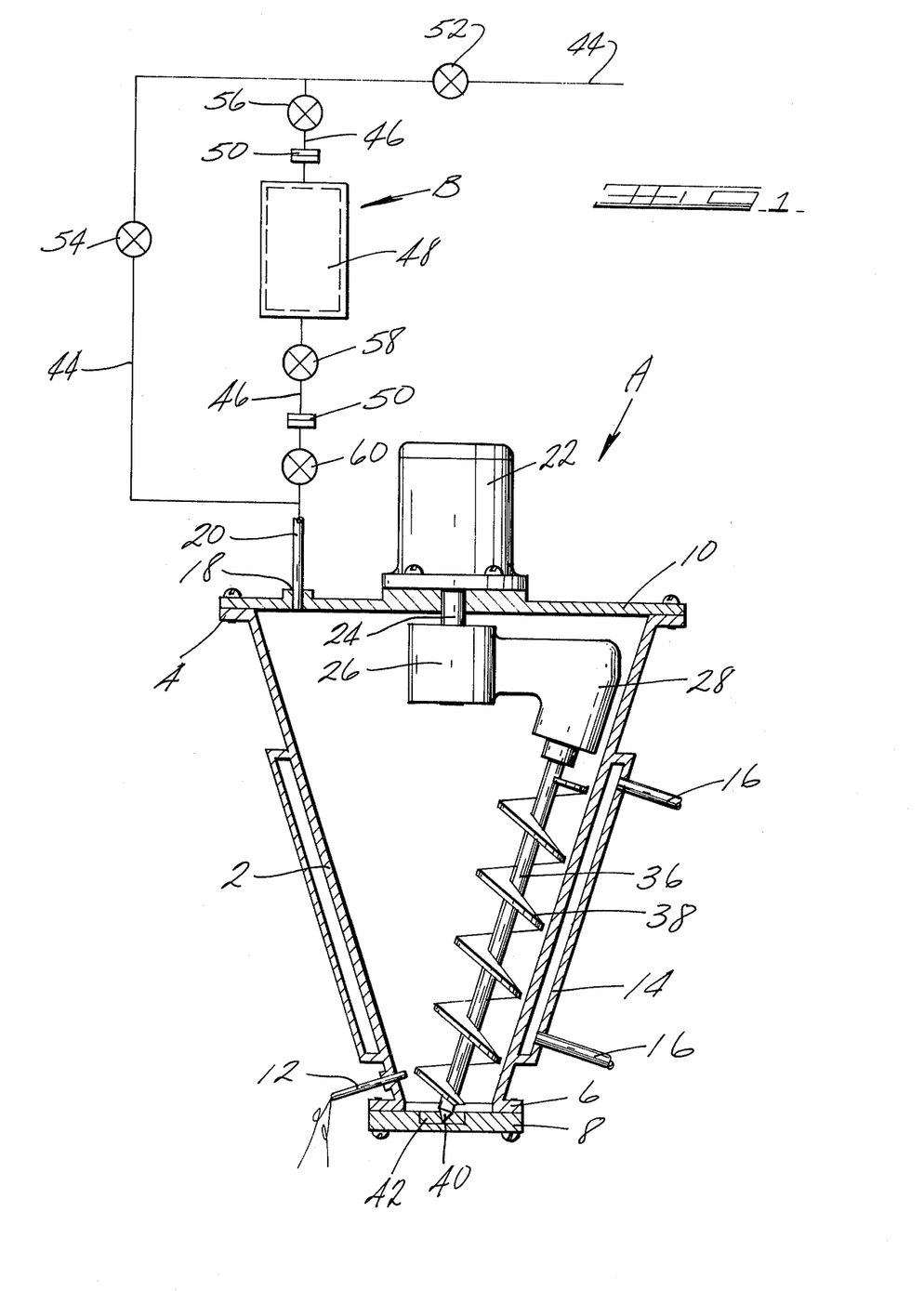

As has heretofore been stated, the reactor employed in Examples 1–5 and 8–12 is described in copending application Ser. No. 111,496, filed Feb. 1, 1971, the disclosure of which is incorporated by reference in this application. In this connection, FIG. 1 is a drawing of the above reactor and is substantially identical with FIG. 1 in the aforementioned Ser. No. 111,486, with the exception that no wiper blades are employed.

In the drawing, there is generally shown a totally enclosed, superatmospheric pressure-sustaining reactor A, having a generally frusto-conically shaped polymerization portion with a vertically disposed longitudinal axis, and a piping system B for supplying needed materials to the reactor. The frusto-conical shape of reactor A is defined by inclined side walls 2, which walls are provided at their top with an annular flange 4 and at the bottom with an annular flange 6. Annular flange 6 provides the support means for sealingly mounting a removable bottom wall 8 to the reactor and flange 4 serves as the support means for sealingly mounting a top wall 10. Reactor A also includes suitable temperature sensing means, such as thermocouple 12, which is sealingly inserted therein, and externally of the reactor, there is provided a conventional, annular jacket 14, which includes conduits 16 fluidly communicating therewith, whereby a suitable heat transfer medium may be circulated through jacket 14. As illustrated in the drawings, top wall 10 includes a charging port 18 into which is sealingly inserted a pipe 20, whereby materials may be charged into the reactor. Mounted externally of reactor A and generally upwardly and upon top wall 10 is a main driving means 22 such as, for example, an electric motor. Main driving means 22 serves to rotate a main driving member 24, which extends through the top wall 10 in a sealed, rotatable manner. Carried by member 24 is a housing 26 to which is also connected an agitator retaining arm 28. Agitator retaining arm 28 is so mounted to housing 26 such that upon rotation of main driving member 24, it will rotate or orbit within the reactor generally about the vertically disposed axis thereof. Agitator retaining arm 28 rotatably carries a suitable agitator such as an elongated shaft 36, whose longitudinal axis is generally inclined with respect to the vertical axis of the reactor and which is generally parallel to side walls 2 with shaft 36 carrying a plurality of helical screw flights 38 thereon. The agitator generally extends substantially to the bottom of the reactor and, as shown in the drawings, may be provided with additional support at the bottom thereof by being provided with a conical point 40 which is supported in a foot-bearing 42 carried by, for example, a recess in removable bottom wall 8. The nature of the support in foot-bearing 42 is such as to allow for the agitator to be rotated about its own longitudinal axis while simultaneously allowing the shaft and its axis to be orbited within the reactor with the orbital motion of agitator retaining arm 28. It will, of course, be understood that disposed internally of agitator retaining arm 28, housing 26, and usually member 24, are suitable interconnecting gear means which provide for the rotation of the agitator about its longitudinal axis simultaneously with the orbital motion of the retaining arm and agitator within the reactor. Typically, the edges of the helical screw flights 38 are positioned within about ½ inch of the internal surface of the side walls 2 and the rotation of the agitator is selected so as to effect a lifting action of the material in the reactor proceeding from the bottom toward the top thereof.

Pipe 20 communicates with a first monomer supply line 44 and a second monomer supply line 46, the latter being in parallel fluid flow with respect to the first monomer supply line. Second monomer supply line 46 carries with it an initiator or catalyst charging vessel 48 which is removably carried by line 46 by suitable means such as couplings 50. Supply line 44 is provided with valves 52 and 54 and second supply line 46 is provided with valves 56, 58 and 60. By appropriate positioning of the valves, it will be seen that monomer from the main supply source can be supplied to pipe 20 in the reactor through line 44 and/or through line 46 and charging vessel 48.

What is claimed is:
1. A dual temperature process for the bulk polymerization of vinyl chloride to obtain vinyl chloride polymers substantially in the form of a powder which comprises:
  a. contacting vinyl chloride and an initiator in the absence of high turbulence at a first temperature of about room temperature to about 110° F until a conversion of approximately 0.1 to 10 percent by weight is obtained, and
  b. thereafter raising the temperature to about 120° to about 150° F and carrying out the polymerization reaction to at least about 65% conversion;
  with the proviso that at least step (b) is carried out under conditions of mild agitation and low turbulence sufficient to ensure complete mixing of the reaction mixture.

2. The process of claim 1, wherein both steps (a) and (b) are carried out under conditions of mild agitation and low turbulence.

3. The process of claim 2, wherein the reaction mass during step (a) is held at a substantially constant temperature for at least about 15 minutes.

4. A dual temperature process for the bulk polymerization of vinyl chloride to obtain vinyl chloride polymers substantially in the form of a powder which comprises:
  a. contacting vinyl chloride and an initiator having a 10-hour half life temperature from about 15° to about 45° C. at a first temperature of from about room temperature to about 110° F. until the conversion of approximately 1 to 5% by weight is obtained; and b. thereafter raising the temperature to about 120° to about 140° F. and adding a second initiator having a 10-hour half life temperature of from about 40° to 60° C. and carrying out the polymerization reaction to at least about 65% conversion;

with the proviso that both steps (a) and (b) are carried out under conditions of mild agitation and low turbulence sufficient to ensure complete mixing of the reaction mixture.

5. The process of claim 4, wherein step (a) is carried out such that the temperature remains substantially constant for a period of time of at least 15 minutes.

6. The process of claim 5, wherein step (a) is carried out at a temperature ranging from about 70° to about 100° F.

7. The process of claim 6, wherein the initiator used in step (a) is present in amounts ranging from 0.001 to 0.1 weight percent of the vinyl chloride.

8. The process of claim 7, wherein the initiator used in step (b) is present in amounts ranging from 0.03 to 0.3 weight percent based on the vinyl chloride.

9. A bulk polymerization process for producing a particulate product at high conversions, said process comprising (a) contacting vinyl chloride with an effective polymerizing amount of an initiator at a substantially constant temperature between about 70° to about 110° F in the absence of violent turbulent agitation until a conversion of approximately 1 to about 5 percent by weight is obtained, and (b) thereafter raising the temperature to about at least 120° to about 150° F and carrying out the polymerization reaction in the presence of an effective polymerizing amount of an initiator to at least about 65 percent conversion at a substantially constant temperature in that range; and wherein at least step (b) is carried out under conditions of mild agitation and low turbulence sufficient to ensure complete mixing of the reaction mixture.

* * * * *